H. M. LANDGRAFF.
STRAINER SUPPORT.
APPLICATION FILED MAR. 26, 1908.
953,274.
Patented Mar. 29, 1910.
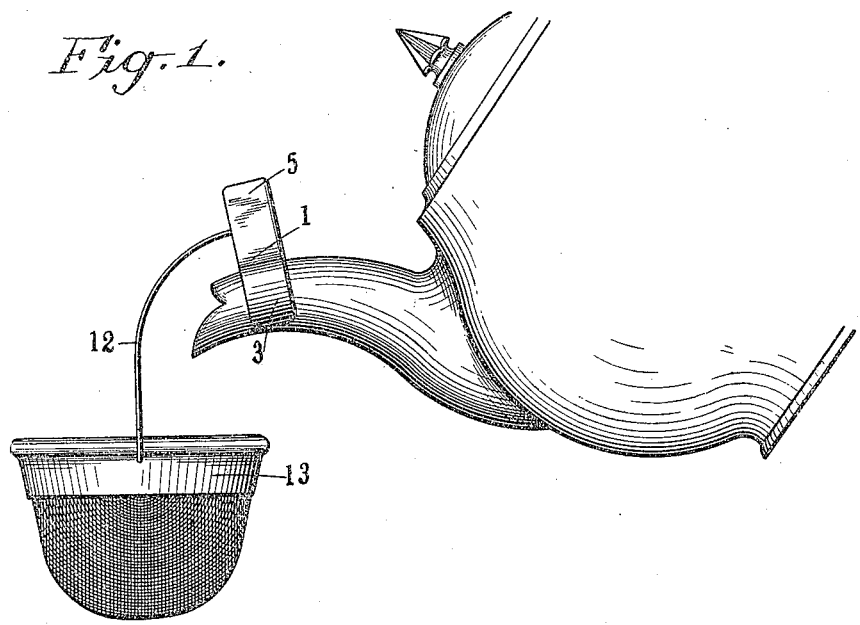
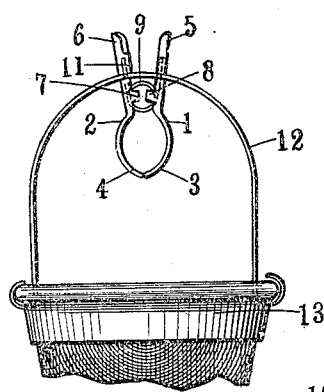
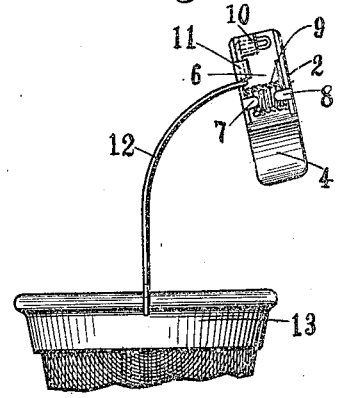
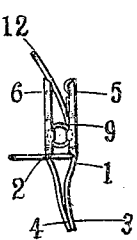

UNITED STATES PATENT OFFICE.

HENRY M. LANDGRAFF, OF NEW YORK, N. Y., ASSIGNOR TO MAX LOEWENSTEIN, OF NEW YORK, N. Y.

STRAINER-SUPPORT.

953,274.  Specification of Letters Patent.  Patented Mar. 29, 1910.

Application filed March 26, 1908. Serial No. 423,396.

*To all whom it may concern:*

Be it known that I, HENRY M. LANDGRAFF, a citizen of the United States, residing at the city of New York, in the county of New York and State of New York, have invented certain new and useful Improvements in Strainer-Supports, of which the following is a specification.

My invention relates to improvements in strainer supports adapted to be attached to pots, kettles, dippers and the like and carrying a strainer basket through which basket the liquids pass in pouring to separate and retain the solid matter.

My primary objects are the simplification and cheapening of such structures and to render them more efficient in use, to obviate all swivel joints and loosely attached parts and to so construct them that they cannot be attached to a pot in any other than the proper manner.

I accomplish my objects in the manner shown in the accompanying drawing in which—

Figure 1 is a side view of the complete strainer on a tea-pot; Fig. 2 a front view of the strainer detached; Fig. 3 a side view of a clasp and supporter; and Fig. 4 a side view of a supporter adapted to engage a coffee pot or dipper.

In practice I take any suitable clasp (of which there are a number on the market) formed of the two pieces 1 and 2 provided with jaws 3 and 4, curved to encircle the outside of a spout, and the finger holds 5 and 6. A spring 9 secured to ears 7 and 8 tends to force the jaws together to hold the clasp to a spout or pot. The ears 10 and 11 on one of the pieces hold a wire 12 bent to form a bifurcated strainer basket support. This support is approximately semi-circular in one direction as shown in Fig. 2 and rearwardly curved in the other as shown in Figs. 1 and 3 and is directly attached to a bailless strainer basket 13 at the free ends. The rearward curve brings the basket under the spout in pouring as the basket is free to swing backward and forward on the trunnion bearings formed on the ends of the support, but is not free to swing around loosely and become entangled as two piece supports do in use.

This construction does away with the use of the strainer basket bail and dispenses with a swivel joint thereby cheapening the cost of production in addition to gaining the advantages before set forth.

The manner of using is fully shown in Fig. 1.

I claim:—

1. As an article of manufacture, a strainer holder comprising a clamp formed with a pair of spring pressed jaws adapted to grip the outside of a vessel and a bifurcated support having the members thereof diverging outwardly and adapted to engage bearings in the rim or the body of the strainer.

2. A strainer holder comprising a pair of hinged spring-pressed jaws, and a support having one end fixed thereto and thence extending substantially laterally therefrom, the outer portion of the support being bifurcated and the members thereof being diverged outwardly, and extending a sufficient distance to enable them to engage bearings in the opposite sides of the rim or body of a strainer.

3. A strainer holder comprising a pair of hinged spring pressed jaws, and a support projecting substantially laterally therefrom and serving as a combined holder and bail for a strainer, said support having the outer portion bifurcated with the extremities of the bifurcations fashioned to engage bearings in diametrically opposite sides of the strainer, upon which extremities the strainer swivels or adjusts itself, substantially as described.

In testimony whereof I have affixed my signature in presence of two witnesses.

HENRY M. LANDGRAFF.

Witnesses:
ROBT. B. KILLGORE,
CONRAD HIEHL.